United States Patent Office 3,260,243
Patented July 12, 1966

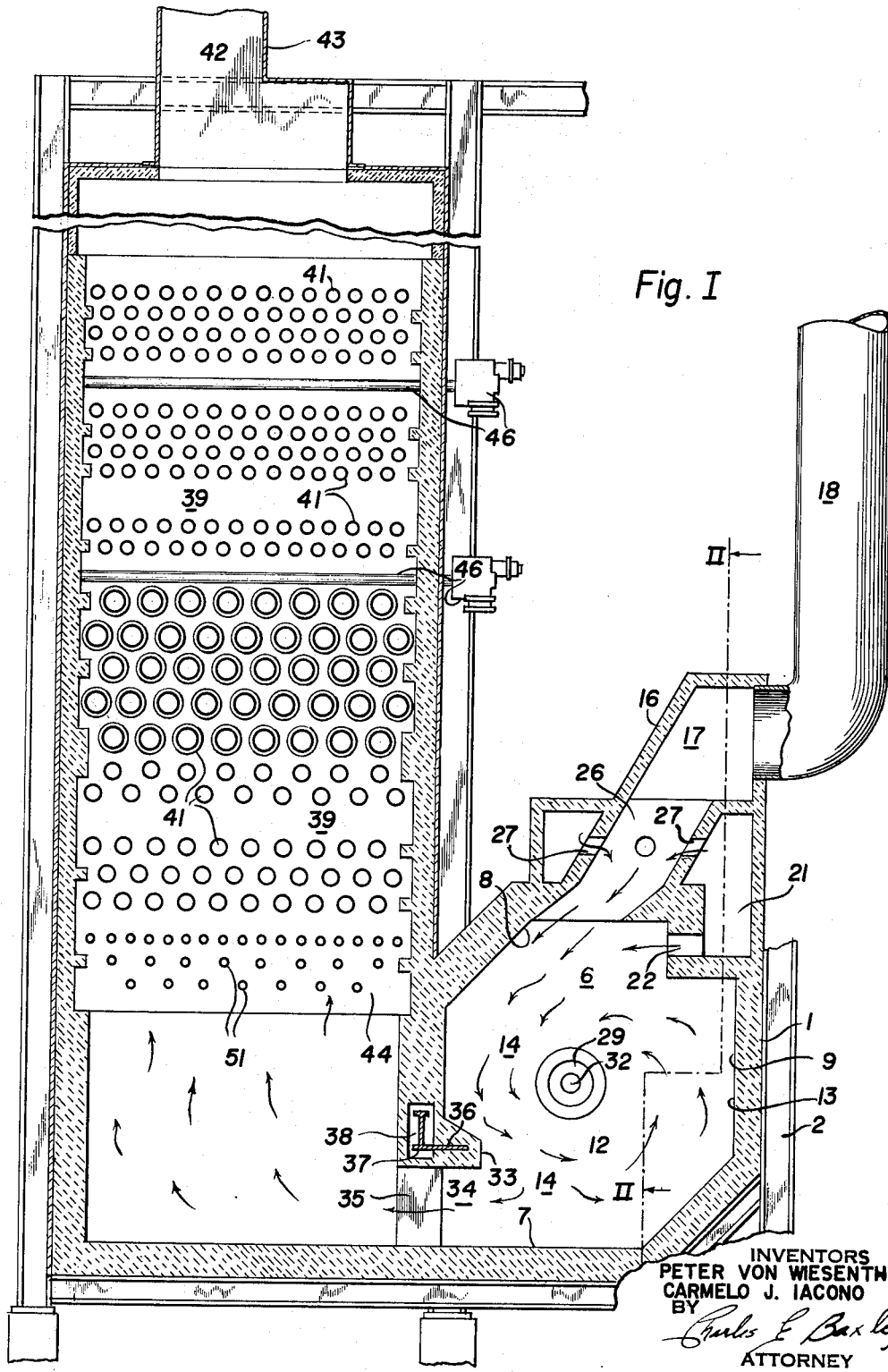
Fig. I
INVENTORS
PETER VON WIESENTHAL
CARMELO J. IACONO
BY
Charles E. Baxley
ATTORNEY

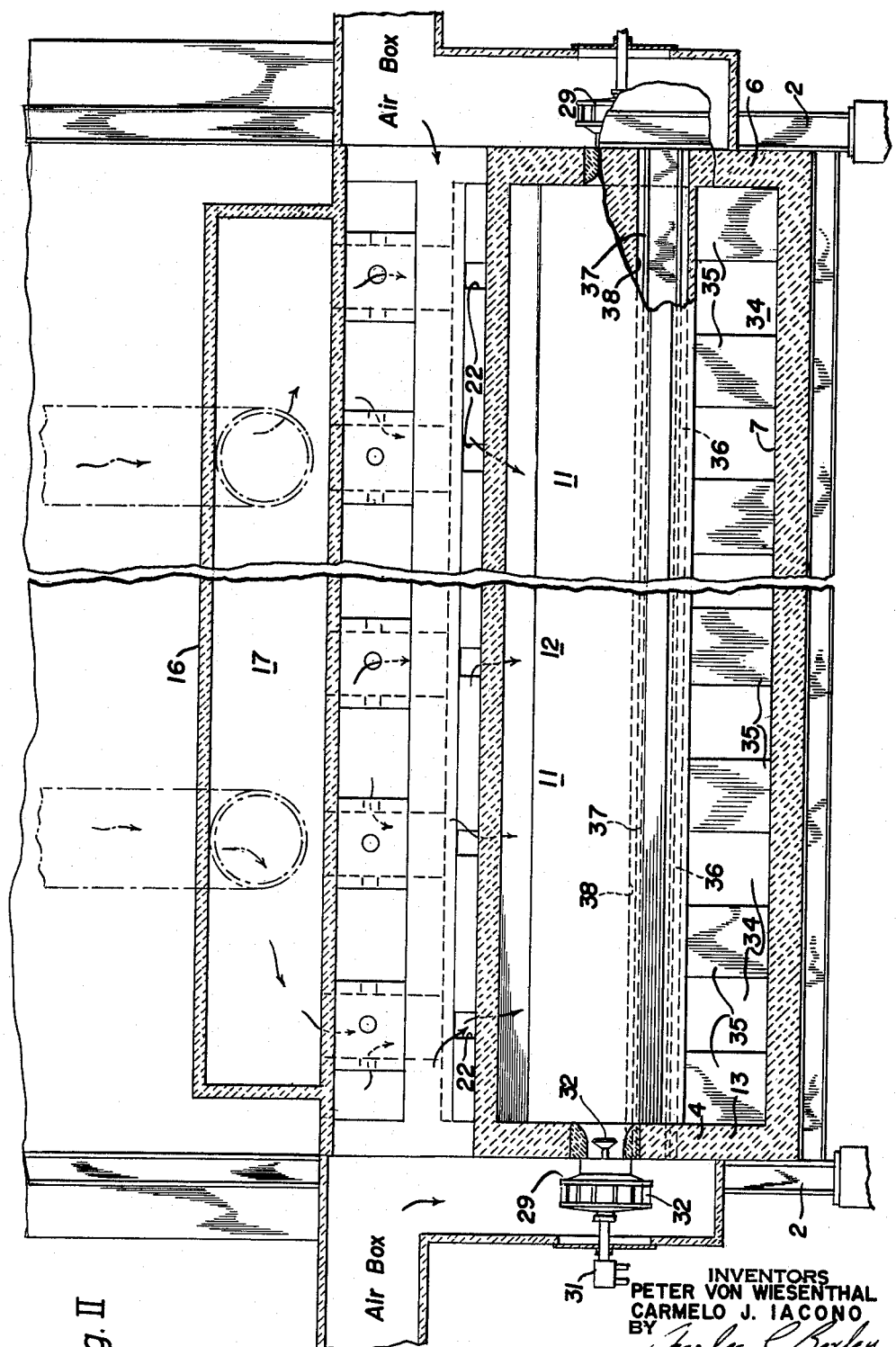
Fig. II

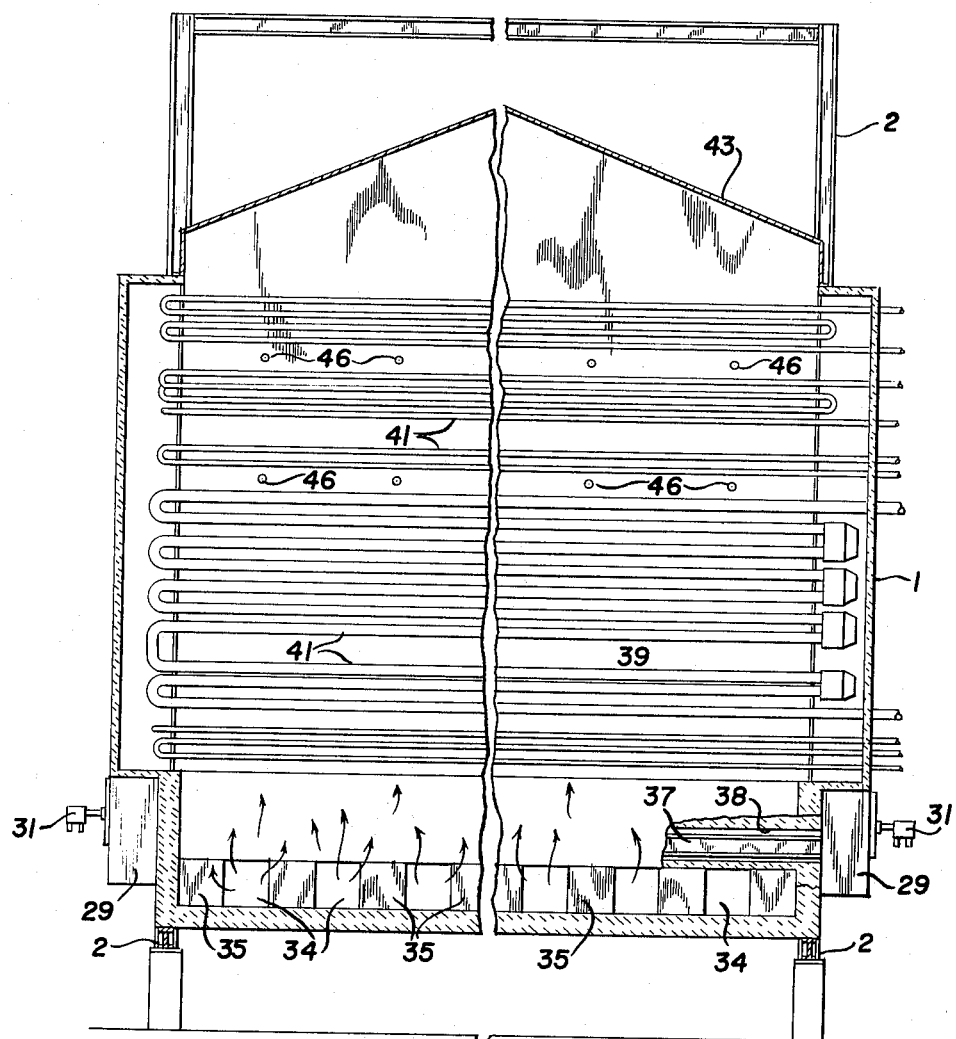
Fig. III

3,260,243
HEATER AND PROCESS SUITABLE FOR LEAN
GASEOUS FUELS
Peter Von Wiesenthal, New York, and Carmelo J. Iacono,
Yonkers, N.Y., assignors to Alcorn Combustion Company, New York, N.Y., a corporation of Delaware
Filed Oct. 13, 1964, Ser. No. 403,621
7 Claims. (Cl. 122—7)

This disclosure relates to firing lean gaseous fuels in substantially inert media. The invention is embodied in an apparatus and related process especially suited to this task.

Commercial application of this invention has been most successful in the firing of carbon monoxide exhausted in off gas from hydrocarbon catalytic cracking units. For illustrative purposes, this disclosure will be set forth in the off gas firing application; however, it should be understood that the apparatus and process taught herein are also applicable to other lean gas firing opportunities.

Ideally, carbon monoxide will burn at about 1128° F. But, in commercial application, even where combustion chambers are provided with high heat capacity settings, satisfactory CO conversion usually requires combustion chamber temperatures above 1500°F. Firing an alternate fuel (in addition to CO) assures adequate temperature levels.

The present advance offers more reliable CO conversion at lower plant cost and at lower alternate fuel requirements than any heretofore achieved in commercial practice. Fundamental analysis indicated a need for the following:

Complete CO conversion in the combustion chamber. Stated somewhat differently, residence time in the combustion chamber had to be made more reliable.

Initiating CO conversion had to accur as soon as the off gas reached the combusion chamber. Design for these features is complicated by the fact that heaters which employ off gas as a fuel usually must also be able to fire alternate fuel alone.

CO firing

At the core of the CO firing application here contemplated is the objective of completely converting CO to $CO_2$ before attempting to recover heat from the combustion gases. This invention achieves complete conversion of CO in the combustion chamber by pitting the flow of reacting gases against the natural exit of combustion gases from the combustion chamber. Turbulence is developed at assure intimate mixing of CO and $O_2$ and to increase the residence time of reactants in the chamber. To induce this turbulence a setting is provided including opposed end walls, a floor, a roof and an outward wall (arranged opposite a bridge wall) with all the foregoing cooperating to enclose a combustion chamber. Off gas and combustion air are directed to flow in a path which is arranged to wash the bridge wall, the floor, the outer wall and the roof in that order. Outlet passages are formed in the bottom of the bridge wall. Combustion gases tend toward exiting the combustion chamber via the outlet passages. To pit reacting gases against these exiting gases a lip is formed on the bridge wall above the outlet passages so that reacting gases washing down the bridge wall are directed back into the combustion chamber to oppose exit of the combustion gases.

It is desirable to protect the lip from extreme temperatures. The lip is supported from a metallic structural member which is mounted in an air cooled heat sink passage which communicates in flow series with the atmosphere.

Rapid initiation of CO conversion is called for. To trigger the reaction some combustion air is injected into the off gas before it enters the combustion chamber.

Alternate fuel firing

The key difference between firing lead CO and firing a richer alternate fuel in this heater is in the temperature levels generated. It is advantageous that this unit be capable of using various alternate fuels. But here it should be borne in mind that burning alternate fuels alone occurs during only a small portion of the time, so that alternate fuel firing condition should not dominate the overall design. The cost of the unit increases substantially with protection from high temperatures. To keep costs down, when firing alternate fuels, addition of excess air permits the reduction of combustion chamber temperatures. For example, when firing oil without excess air, combustion chamber temperatures would require expensive construction. Additions of from 60 to 75% excess air reduces these temperature levels to the vicinity of 2200°F. which is more compatible with the class of structure called for by usual CO firing.

During alternate fuel firing, protection of gas and air plena becomes critical. Even with high excess air for firing an alternate fuel, if combustion gases were to enter the air and gas plena, they would have to be built to withstand substantially the same temperatures as the combustion chambers. Clearly in view of the limited extent of alternate fuel firing, the design of these plena for such severe conditions is not justifiable.

The present design recognizes that excess air, associated with alternate fuel firing, offers an opportunity for cooling and protecting the gas and air plena. When firing an alternate fuel in this unit, a major portion of the excess air is introduced via the air plenum into the upper portions of the combustion chambers as air jets. Flowing air has a cooling effect. Further, the air forms a barrier below and along the roof prohibiting access of combustion gases from the combustion chambers into either the air plenum or the gas plenum.

These and other features will appear more fully from the accompanying drawings wherein:

FIGURE I is an elevation view in section of a heater according to this invention.

FIGURE II is a broken elevation view in section taken along line II—II of FIGURE I.

FIGURE III is a broken elevation view in section taken through the heat-recovery section.

In the drawings section 1 is supported by steel frame 2 which carries loads to foundation piers 3. Setting 1 includes opposed end walls 4 and 6, floor 7 and roof 8 as well as outward wall 9 arranged opposite bridge wall 11 all cooperating to enclose combustion chamber 12 therewithin. The interior of combustion chamber 12 is lined with high quality refractory brick 13.

This heater is generally intended for firing a burnable waste gas in a mixture of insert gases. Such a mixture of gases is usually produced by carbon burn off in catalyst regenerators or by some similar catalyst regenerative process. These sources usually exhaust off gas out their upper ends so CO bearing off gas or some other lean gaseous fuel becomes available for heat recovery purposes in a downward flowing stream. Gas inlet means introduce the gas mixture into combustion chamber 12 to form a plurality of gas streams 14. Gas shroud 16 forms gas plenum 17 above roof 8. The off gas mixture reaches gas plenum 17 by way of gas duct 18.

Combustion of the lean gaseous fuel is supported by air or some other oxygen-rich gas. Air inlet means introduce air into combustion chamber 12 to form a plurality of air jets 19. Forced draft fans (not shown) serve as a source of supply for air and also serve as means for pressurizing the air delivered to the heater. In some instances fans are unnecessary. Air shroud 16 cooperates with roof 8 and gas plenum 17 to define air plenum 21 between gas plenum 17 and roof 8. Appropriate air ducts connect air plenum 21 for supply from the forced draft fans.

To deliver the off gas mixture to combustion chamber 12, gas shroud 16 defines first gas ports 23 connected in flow series with gas plenum 17. Roof 8 defines gas inlet ports 24 connected in flow series with combustion chamber 12. Gas conduits 26 are each connected to gas shroud 16 about one of the first gas ports 23. These gas conduits 26 traverse air plenum 21 and are each connected to roof 8 about one of the gas inlet ports 24 to connect gas plenum 17 in flow series with combustion chamber 12 for introducing the off gas mixture thereto as gas streams 14.

For premixing air with the gas mixture before it enters combustion chamber 12, premix ports 27 connect air plenum 21 with the interiors of gas conduits 26 to inject air into these conduits. Air also enters combustion chamber 12 via air plenum 21 through air inlet ports 22 defined by roof 8.

Preheating of combustion chamber 12 is accomplished by use of auxiliary burners 29 (of known design) which penetrate setting 1 through end walls 4 and 6. Burners 29 are connected by alternate fuel lines 31 with a source of alternate fuel (not shown). The alternate fuel may be practically any gaseous, liquid, or liquifiable hydrocarbon. Combustion supporting air is delivered to auxiliary burners 29 through air ports 22 and burner air passages 32.

Intimate mixing of off gas and air is accomplished by directing air jets 19 to intersect and join with gas streams 14. Gas conduits 26 and air inlet ports 22 are organized so that each gas stream 14 has at least one air jet 19 directed there onto for mixing of lean fuel and oxygen whereby a comingled mass of reacting gases is formed.

Reacting gases are arranged to oppose the exit of combustion gases from combustion chamber 12. Gas conduits 26 and air inlet ports 22 are directed to form stream 14 flowing in a vortical path which washes over bridge wall 11, floor 7, outward wall 9 and roof 8 in that sequence. Bridge wall 11 has lip 33 formed above outlet passages 34 and projecting into combustion chamber 12 so that combustion gases washing down bridge wall 11 are directed back into combustion chamber 12 to oppose the exit of gases therethrough. The turbulence developed by this expedient improves mixing of CO and $O_2$ and increases residence time in combustion chamber 12. Accordingly, smaller combustion chambers become possible. Baffles 35 are spaced from each other so as to control the distribution of gases through outlet passages 34.

Lip 33 is subjected to severe thermal conditions. Cooling of this lip is desirable. To accomplish cooling, lip 33 is supported from a metallic member shown as a built-up section including plate 36 and wide flange member 37. Wide flange member 37 accepts heat from plate 36 and in turn is housed in heat-sink passage 38 defined by bridge wall 11 wherein wide flange member 37 is cooled by circulating air from the atmosphere. Thus the thermal conditions on lip 33 are improved.

In order to avoid loss of ignition or pulsating detonation, during load changes or varying concentrations of CO in the off gas, setting 1 is lined with refractory blocks 13 (or a castable refractory) to give a fly wheel heat storage effect. The reacting comingled mass passes in washing relationship over the surfaces of the refractory blocks to store heat therein. Even in the event of failure of burners 29, heat from the refractory blocks 13 would support stable combustion for a considerable period of time. The absence of any heat sink in combustion chamber 12 approaches the ideal adiabatic oxidation condition for CO. Thus ignition stability is assured.

This design calls for complete CO conversion to $CO_2$ before any attempt is made to recover heat from the combustion products. Heat recovery section 39 is formed by setting 1. Outlet passages 34 connect in flow series with heat recovery section 39 to exhaust gases thereto. Tube coils 41 are mounted in heat recovery section 39. Means are provided for circulating one or more fluids through coils 41 for non-contact heat exchange with the combustion products passing through heat recovery section 39. Flue means shown as stack 42 and hood 43 communicate in flow series with heat recovery section 39 to exhaust gases therefrom.

In hydrocarbon catalytic cracking off gas applications, heat recovery is used for either hydrocarbon heating or for steam generation or for both. The relatively low equilibrium temperatures of this design suggest that the preponderance of heat transfer to tube coils 41 is by means of convection. In steam generation, forced circulation is employed rather than natural circulation boiling because in natural circulation units these low temperature levels have on occasion resulted in serious circulation problems. Forced circulation overcomes these problems by assuring positive and uniform velocities in all tubes of a coil. By this expedient local mineral deposition and scaling are reduced.

Where steam is to be generated, screen tubes 44, located in the hottest portion of heat recovery section 39, are filled with water under positive circulation at all times thereby keeping tube metal temperatures close to those of the water. This is opposite to the condition found in natural circulation units wherein screen tubes 44 generally steam at the highest rates and are, therefore, most subject to fouling. In the case of overfiring, the screen tubes of a conventional natural circulation boiler may even go to complete dryness with serious consequences. This situation is obviated in the present forced circulation unit—even at maximum overload conditions, screen tubes 44 are always filled with water.

Relatively large tube sizes in the order of 4.5" O.D. are employed. These large tubes permit several worthwhile advantages. First, large tubes minimize any problems resulting from high concentrations of solids. Second, the substantial wall thickness of large tubes offer protection should external erosion conditions be severe. Third, large tube sizes eliminate potential vibration problems. In this regard the tendency in CO fired units has been to attempt increasing heat transfer co-efficients. Toward this objective velocities are stepped up. At critical velocities however, the von Karman effect induced along the tube lengths results in vibrations which at resonance frequencies can have most distressing consequences. Small diameter bent tubes rolled into drums have been the worst performers on this score. In the present design, the generous sizes of tube coils 41 in conjunction with the straight tube lengths and positive supports makes destructive vibration most unlikely.

Soot blowers 46 are fitted for complete cleaning of tube coils 41.

When firing alternate fuel alone, air plenum 21, premix ports 27 and air inlet ports 22 serve to communicate with the forced draft fans for introducing air to cool air plenum 21 and to form an air barrier below and along roof 8 prohibiting entry of combustion gases into gas plenum 17.

It will be apparent to those skilled in the fired heater design that wide changes can be made in the shown embodiment without departing from the main theme of invention set forth in the following claims.

What is claimed is:

1. A combustor suitable for a lean fuel occurring in a predominantly inert gas mixture, the combustor comprising
   a setting which includes opposed end walls, and a bridge wall and a floor and a roof as well as an outward wall arranged opposite the bridge wall with all of the aforegoing cooperating to enclose a combustion chamber therewithin,
   the bridge wall having a lower edge depending a substantial distance downward from the roof toward the floor, gas inlet means for introducing a lean fuel occurring in a predominantly inert gas mixture into the combustion chamber, a lip formed on the lower edge and projecting into the combustion chamber with the bridge wall and lip of sufficient size and positioned to conduct the gas mixture in a vertical path which washes the bridge wall, the floor, the outer wall and the roof in that sequence, at least one auxiliary burner penetrating through the setting and adapted to fire an alternate fuel for heating the lean fuel above its kindling temperature, air inlet means for introducing air into the combustion chamber to form at least one air jet, the air inlet means organized relative the gas inlet means so that each gas stream is intersected by an air jet for mixing of the lean fuel with oxygen, refractory lining the interior of the combustion chamber so that heat is stored therein to stabilize combustion of the lean fuel, the volume of the combustion chamber sufficiently large so that substantially all of the lean fuel is burned therein, the bridge wall spaced from the floor to define at least one outlet passage suitable for exhausting gases from the combustion chamber, the bridge wall and the lip organized above the outlet passage so that combustion gases washing down the bridge wall are directed by the lip back into the combustion chamber to oppose the exit of combustion gases via the outlet passage so that turbulence is developed to increase the residence time of gases in the combustion chamber, 2. The combustor of claim 1 with the air inlet means arranged so that the air jet is directed to join in the vortical path former by the gas stream.

3. The combustor of claim 2 with the roof defining the gas inlet means.

4. The combustor of claim 3 with premix means for injecting air into the gas mixture before the gas mixture reaches the combustion chamber.

5. The combustor of claim 4 with the auxiliary burner penetrating the setting via one of the end walls inward of the vortical path formed by the gas stream so that the alternate fuel as it burns is drawn outward into the vortical path.

6. A fired heater suitable for a lean fuel occurring in a predominantly inert gas mixture, the heater comprising in combination a setting which includes opposed end walls and a bridge wall and a floor and a roof as well as an outward wall arranged opposite the bridge wall with all the foregoing cooperating to enclose a combustion chamber therewithin, the bridge wall having a lower edge depending a substantial distance downward from the roof toward the floor, a gas shroud defining a gas plenum above the roof, means connecting the gas plenum in flow series with a source of a lean fuel occurring in a predominantly inert gas mixture, a lip formed on the lower edge and projecting into the combustion chamber with the bridge wall and lip of sufficient size and positioned to conduct the gas mixture in a vortical path which washes the bridge wall, the floor, the outer wall and the roof in that sequence, an air shroud cooperating with the roof to define an air plenum between the gas plenum and the roof, a source of air, means connecting the source of air in flow series with the air plenum, the gas shroud defining at least one first gas port connected in flow series with the gas plenum, the roof defining at least one gas inlet port connected in flow series with the combustion chamber, a gas conduit connected to the gas shroud about the first gas port and traversing the air plenum and connected to the roof about the gas inlet port to connect the gas plenum in flow series with the combustion chamber for introducing the gas mixture thereto in a gas stream, means for pressurizing the air in the air plenum, the gas conduit defining a premix port connecting the air plenum in flow series with the conduit to inject air into the gas mixture before it reaches the upstream portion of the combustion chamber, the setting defining at least one air inlet port connecting the air plenum in flow series with the combustion chamber so that air enters the combustion chamber in a jet, the gas conduit and the air port organized so that the gas stream is intersected by the air for mixing of the lean fuel and oxygen whereby a comingled mass of combustion gases is formed, at least one auxiliary burner penetrating through the setting via the end wall inward of the vortical path formed by the gas stream and adapted to fire an alternate fuel for heating the lean fuel above its kindling temperature, refractory lining the interior of the combustion chamber so that heat is stored therein to stabilize combustion of the lean fuel, the volume of the combustion chamber sufficiently large so that substantially all of the lean fuel is burned therein, the bridge wall spaced from the floor to define at least one outlet passage suitable for exhausting combustion gases from the combustion chamber, the bridge wall and the lip organized so that combustion gases washing down the bridge wall are directed by the lip back into the combustion chamber to oppose the exit of combustion gases via the outlet passage so that turbulence is developed to increase the residence time of gases in the combustion chamber, the lip depending from a metallic member within the bridge wall, the bridge wall defining a heat-sink passage which connects in flow series by means of circulating air to the atmosphere, the metallic member projecting into the heat sink passage so that heat is removed from the lip through the metallic member and thence through the circulating air to the atmosphere, the setting defining a heat recovery section connecting in flow series with the outlet passage to receive combustion gases exhausted from the combustion chamber, at least one tube coil mounted in the heat recovery section, means circulating a process stream through the tube coil for non-contact heat exchange with gases in the heat recovery section, flue means connected in flow series with the heat recovery section to exhaust combustion gases therefrom.

7. A process for recovering heat from a lean fuel occurring in a predominantly inert gas mixture, the process comprising the steps of providing a combustion zone suitable for accommodating a vortical path for gases flowing therein, providing an outlet which opens to the combustion zone in a counter revolutionary sense relative to the vortical path, providing a flow gradient to cause exit of gases from the combustion zone via the outlet, preheating the combustion zones to a temperature in excess of 1128° F., introducing the gas mixture into the combustion zone so that it flows in the vortical path, introducing air into the combustion zone so that it joins the gas mixture, providing a high-heat capacity refractory to line the combustion zone so that the combustion zone is substantially adiabatic whereby the combustion gases wash the refractory for fly-wheel heat storage in the refractory to stabilize combustion of the lean fuel, sizing the combustion zone sufficiently large to allow substantially complete burning of the lean fuel therein, directing the vortical path to oppose the exit of combustion gases via the outlet so that turbulence is developed to increase the residence time of gases in the combustion zone, providing a heat recovery zone downstream relative to the outlet to receive combustion gases therefrom, extracting heat from the combustion gases in heat recovery zone by means of non-contact heat exchange with a circulating fluid, exhausting combustion gases from the heat recovery zone.

References Cited by the Examiner

UNITED STATES PATENTS 3,207,201   9/1965   Zink et al. _____ 158—1

KENNETH W. SPRAGUE, *Primary Examiner.*